US012726307B2

(12) United States Patent
Raghavan et al.

(10) Patent No.: US 12,726,307 B2

(45) Date of Patent: Sep. 1, 2026

(54) METHODS FOR USING TWO-WAY BEAMFORMING OPERATIONS FOR CALIBRATION

(71) Applicant: QUALCOMM Incorporated, San Diego, CA (US)

(72) Inventors: Vasanthan Raghavan, West Windsor Township, NJ (US); Kobi Ravid, Closter, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 17/661,517

(22) Filed: Apr. 29, 2022

(65) Prior Publication Data

US 2023/0353309 A1 Nov. 2, 2023

(51) Int. Cl.
*H04L 5/00* (2006.01)

(52) U.S. Cl.
CPC .......... *H04L 5/0051* (2013.01); *H04L 5/0055* (2013.01)

(58) Field of Classification Search
None
See application file for complete search history.

(56) References Cited

U.S. PATENT DOCUMENTS 8,891,597 B1 * 11/2014 Zhang .................. H04B 7/0617 375/267
2007/0205504 A1 * 9/2007 Kobayashi .............. H01L 25/18 257/723
2007/0206504 A1 * 9/2007 Koo .................... H04L 25/0398 455/39
2015/0341096 A1 * 11/2015 Gao ..................... H04B 7/0615 370/278
2018/0191418 A1 * 7/2018 Xia ...................... H04B 7/0617
2019/0182884 A1 * 6/2019 Deenoo ................. H04W 16/28
2019/0327060 A1 * 10/2019 Liu ...................... H04B 7/0417
2020/0287604 A1 * 9/2020 Gao ..................... H04B 7/0617
2021/0126362 A1 * 4/2021 Jiang ...................... H01Q 3/267
2022/0060242 A1 * 2/2022 Sakhnini ........... H04W 72/1263
2022/0271802 A1 * 8/2022 Lee ........................ H04B 17/11
2022/0279535 A1 * 9/2022 Tsui .................... H04L 25/0222
2024/0089016 A1 * 3/2024 Marcone ................ H04B 17/12
2024/0244533 A1 * 7/2024 Niu ......................... H04W 8/24

* cited by examiner

*Primary Examiner* — Adnan Baig
(74) *Attorney, Agent, or Firm* — QUALCOMM Incorporated

(57) ABSTRACT

Method and apparatus for two-way beamforming operations for calibration. The apparatus receives a first set of reference signals from a network node using N sets of beam weights over N symbols. The apparatus estimates a complex-valued beamformed channel based on the first set of reference signals. The apparatus transmits a second set of reference signals to the network entity using the N sets of beam weights. The apparatus receives a set of feedback signals from the network entity comprising measurements of the transmitted second set of reference signals. The apparatus computes a set of calibration adjustment factors between transmit and receive parts of a set of beam weights based on the set of feedback signals and the estimated complex-valued beamformed channel. The apparatus performs a calibration adjustment operation based on the computed set of calibrated adjustment factors.

30 Claims, 12 Drawing Sheets

One Frame (TDD)
10 ms
200
subframe
RB
slot
D D D D D D D D D D D D F U
OFDM symbol
slot
subcarrier
DMRS R
CSI-RS 230
PDCCH CORESET
SSS
PSS
PDSCH
PBCH
REG 12 REs
1 CCE = 6 REGs
SS/PBCH Block
BWP
BWP
20 RBs
channel bandwidth RBs One Frame (TDD)
10 ms
250
subframe
RB
slot
U U U U U U U U U U U U U U
OFDM symbol
slot
SRS
subcarrier
SRS Comb 0
SRS Comb 1
DMRS R

280
PUCCH
PUSCH

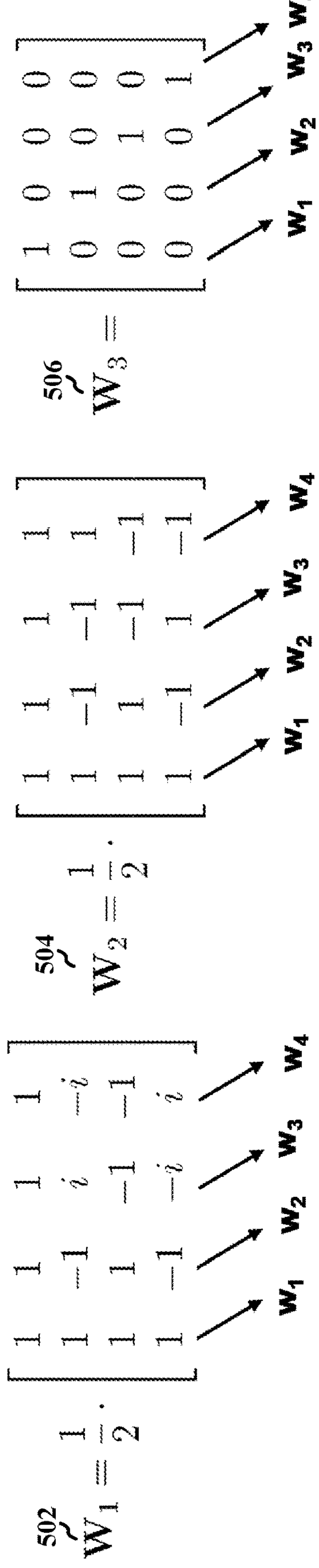
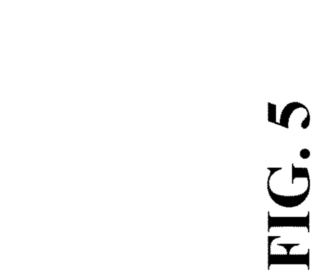
FIG. 5

Figure 6:
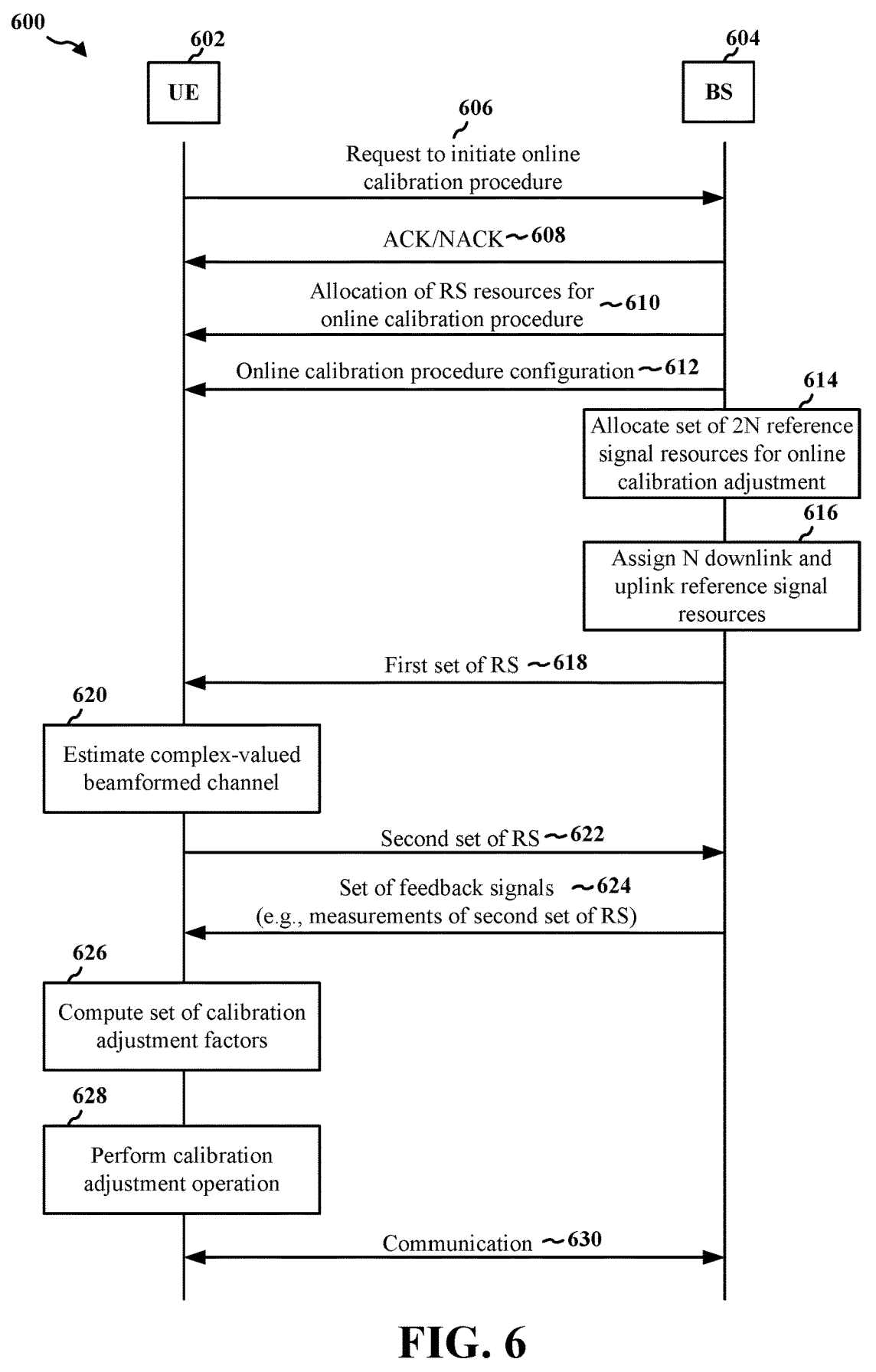

600

602 UE

604 BS

606 Request to initiate online calibration procedure

ACK/NACK 608

Allocation of RS resources for online calibration procedure 610

Online calibration procedure configuration 612

614 Allocate set of 2N reference signal resources for online calibration adjustment 616 Assign N downlink and uplink reference signal resources First set of RS 618

620 Estimate complex-valued beamformed channel

Second set of RS 622

Set of feedback signals (e.g., measurements of second set of RS) 624

626 Compute set of calibration adjustment factors

628 Perform calibration adjustment operation

Communication 630

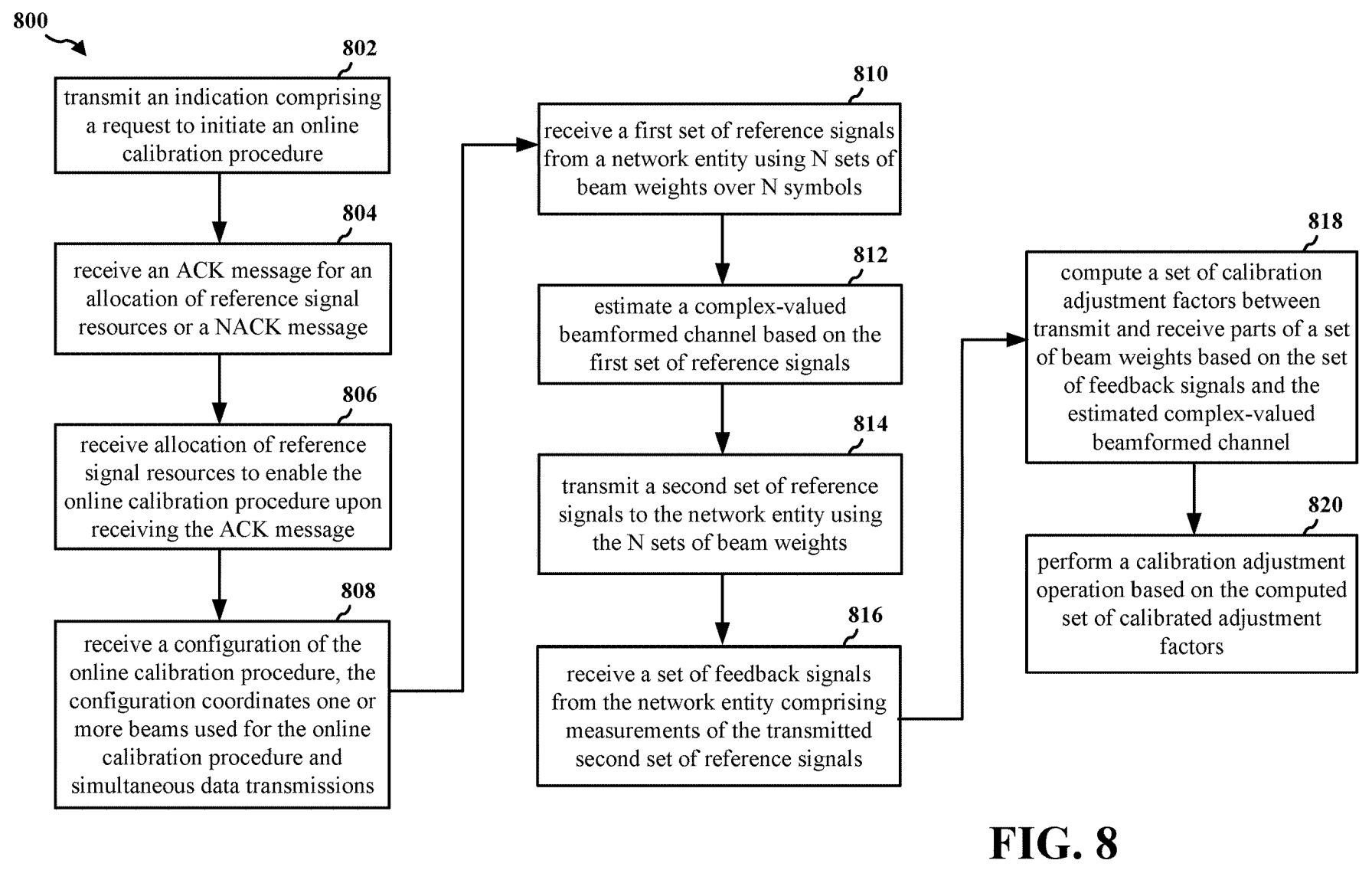

802 transmit an indication comprising a request to initiate an online calibration procedure 804 receive an ACK message for an allocation of reference signal resources or a NACK message 806 receive allocation of reference signal resources to enable the online calibration procedure upon receiving the ACK message 808 receive a configuration of the online calibration procedure, the configuration coordinates one or more beams used for the online calibration procedure and simultaneous data transmissions 810 receive a first set of reference signals from a network entity using N sets of beam weights over N symbols 812 estimate a complex-valued beamformed channel based on the first set of reference signals 814 transmit a second set of reference signals to the network entity using the N sets of beam weights 816 receive a set of feedback signals from the network entity comprising measurements of the transmitted second set of reference signals 818 compute a set of calibration adjustment factors between transmit and receive parts of a set of beam weights based on the set of feedback signals and the estimated complex-valued beamformed channel 820 perform a calibration adjustment operation based on the computed set of calibrated adjustment factors

FIG. 8

METHODS FOR USING TWO-WAY BEAMFORMING OPERATIONS FOR CALIBRATION

TECHNICAL FIELD

The present disclosure relates generally to communication systems, and more particularly, to a configuration for two-way beamforming operation for calibration.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receiving a first set of reference signals from a network entity using N sets of beam weights over N reference symbols. The apparatus estimates a complex-valued beamformed channel based on the first set of reference signals. The apparatus transmits a second set of reference signals to the network entity using the N sets of beam weights. The apparatus receives a set of feedback signals from the network entity comprising measurements of the transmitted second set of reference signals. The apparatus computes a set of calibration adjustment factors between transmit and receive parts of a set of beam weights based on the set of feedback signals and the estimated complex-valued beamformed channel. The apparatus performs a calibration adjustment operation based on the computed set of calibrated adjustment factors.

In an aspect of the disclosure, a method, a computer-readable medium, and an apparatus are provided. The apparatus may be a device at a network entity. The device may be a processor and/or a modem at a network entity or the network entity itself. The apparatus allocates a set of 2N reference signal resources for online calibration adjustment, where N is a number of antenna elements being calibrated at a user equipment (UE). The apparatus assigns N downlink reference signal resources and N uplink reference signal resources over the set of 2N reference signal resources according to some order/permutation of resource allocation. The apparatus outputs a first set of reference signals using a first beam. The apparatus obtains a second set of reference signals using the first beam. The apparatus outputs a feedback signal comprising measurements of the second set of reference signals to allow for an online calibration adjustment computation based on the feedback signal.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating examples of beam weights used for phase measurements.

FIG. 6 is a call flow diagram of signaling between a UE and a network entity.

FIG. 8 is a flowchart of a method of wireless communication.

DETAILED DESCRIPTION

Figure 1:
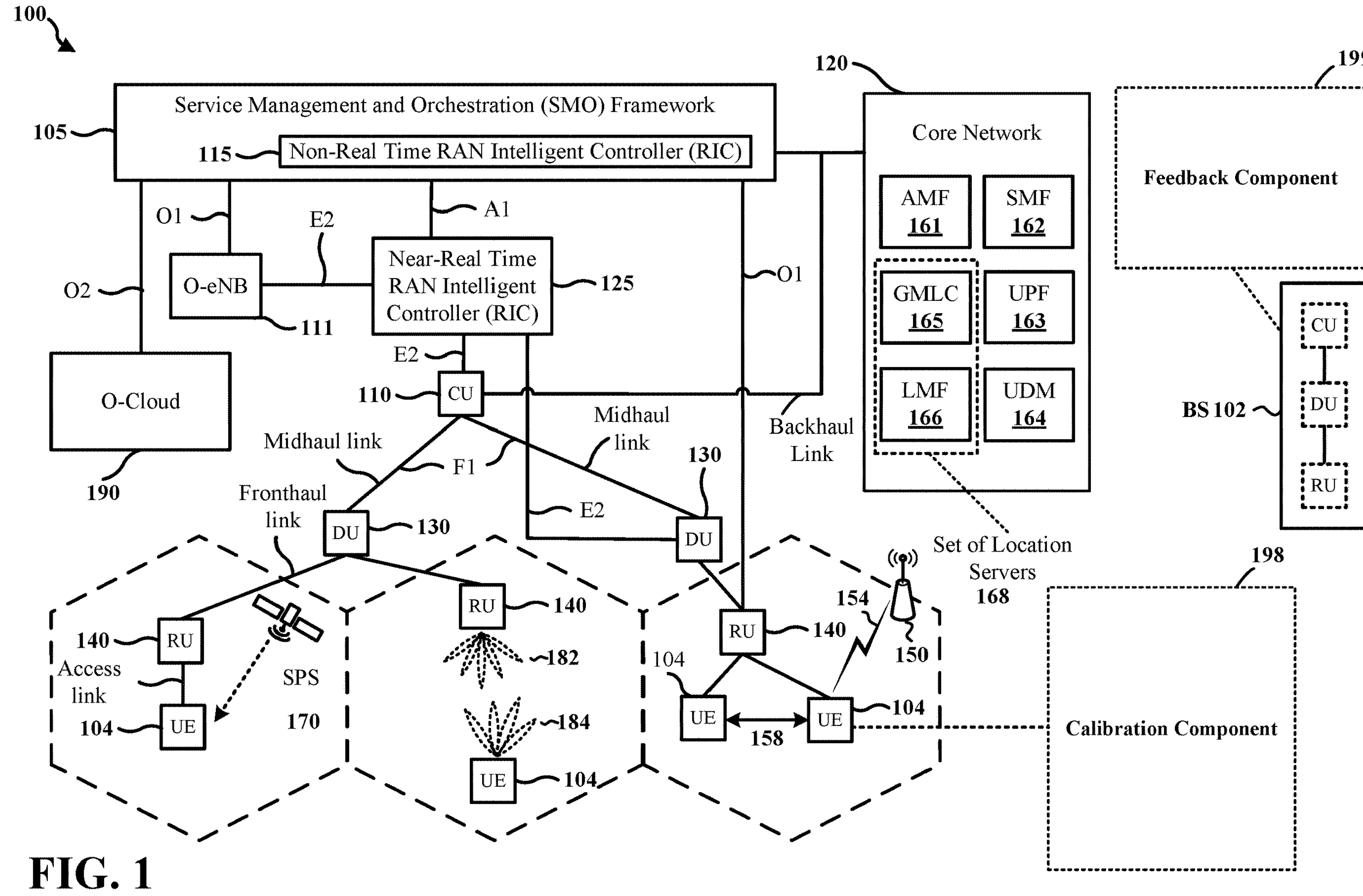
FIG. 1 is a diagram illustrating an example of a wireless communications system and an access network.

In wireless communications, for example millimeter wave (mmW) communications, hybrid beamforming may be utilized to coherently combine energy and overcome high path losses that may occur at higher frequencies. The computing of hybrid beamforming weights for signaling may assist in overcoming the high path losses. Beamforming weights may be computed at the UE in receive (RX) mode. However, the same weights may not be reused for transmit (TX) from the UE antennas since the radio frequency pathways and/or circuitry may be different between downlink and uplink.

Hybrid beamforming requires a calibrated system between uplink circuitry for uplink communications and downlink circuitry for downlink communications because different circuitries are used for uplink and downlink communications. To perform the calibration, the UE takes into account any discrepancies determined between the downlink circuitry and the uplink circuitry. The UE may perform an adjustment based on the discrepancies determined between the downlink circuitry and the uplink circuitry. For example, the UE may receive a downlink transmission and may apply a calibration adjustment to the uplink transmission. The calibration procedure occurs while the UE is offline, before any uplink or downlink communications at the UE. For example, this offline calibration can happen in a factory setting.

Aspects presented herein provide a configuration for determining calibration adjustment parameters in an online calibration procedure. The configuration may utilize a two-way hybrid beamforming operation to perform the online calibration procedure to determine the calibration adjustment parameters. The aspects presented herein may allow a UE to perform an online calibration adjustment operation using a two-way hybrid beamforming operation.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions.

Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a calibration component 198 configured to receive a first set of reference signals from a network entity using N sets of beam weights over N symbols; estimate a complex-valued beamformed channel based on the first set of reference signals; transmit a second set of reference signals to the network entity using the N sets of beam weights; receive a set of feedback signals from the network entity comprising measurements of the transmitted second set of reference signals; compute a set of calibration adjustment factors between transmit and receive parts of a set of beam weights based on the set of feedback signals and the estimated complex-valued beamformed channel; and perform a calibration adjustment operation based on the computed set of calibrated adjustment factors.

Referring again to FIG. 1, in certain aspects, the base station 102 may include a feedback component 199 configured to allocate a set of 2N reference signal resources for online calibration adjustment, where N is a number of antenna elements being calibrated at a user equipment (UE);

assign N downlink reference signal resources and N uplink reference signal resources over the set of 2N reference signal resources; output a first set of reference signals using a first beam; obtain a second set of reference signals using the first beam; and output a feedback signal comprising measurements of the second set of reference signals to allow for an online calibration adjustment computation based on the feedback signal.

Although the following description may be focused on 5G NR, the concepts described herein may be applicable to other similar areas, such as LTE, LTE-A, CDMA, GSM, and other wireless technologies.

Figures 2A, 2B, 2C, 2D:
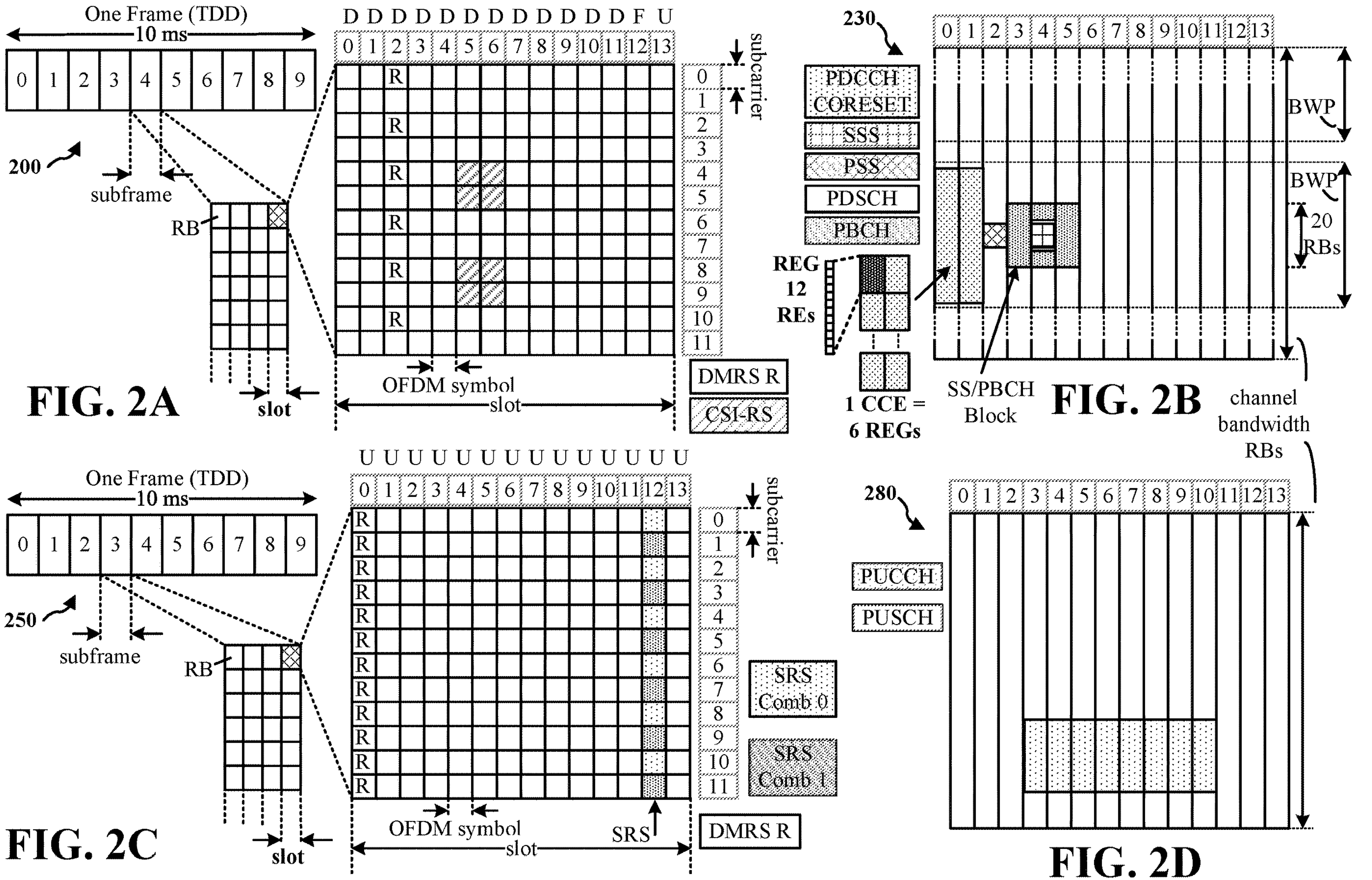
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
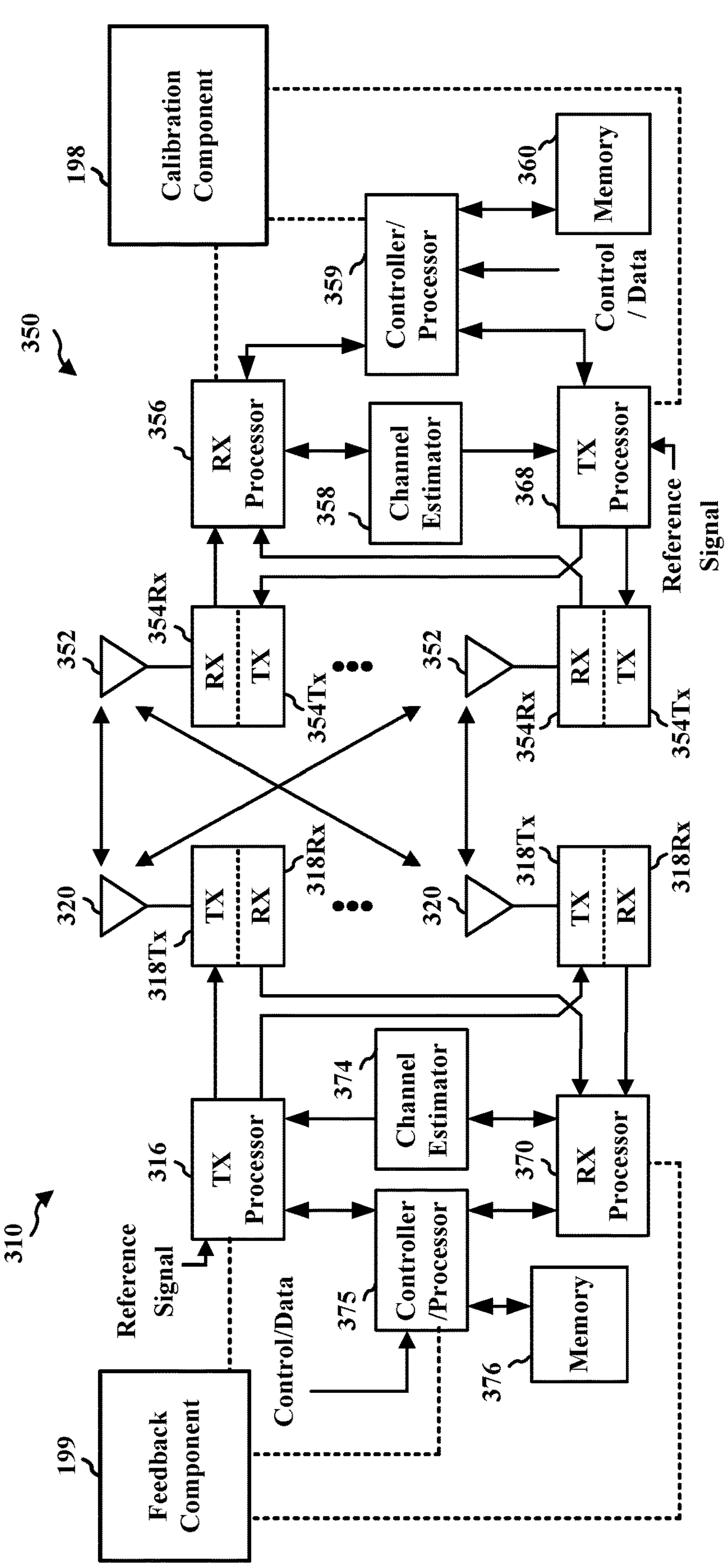
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the calibration component 198 of FIG. 1.

At least one of the TX processor 316, the RX processor 370, and the controller/processor 375 may be configured to perform aspects in connection with the feedback component 199 of FIG. 1.

In wireless communications, for example mmW communications, beamforming may be utilized to coherently combine energy and overcome high path losses that may occur at higher frequencies. The computing of beamforming weights for signaling may assists in overcoming the high path losses. Beamforming weights may be computed at the UE in RX mode. However, the same weights may not be reused for TX from the UE antennas since the radio frequency pathways and/or circuitry may be different (e.g., different set of amplifiers, mixers, couplers, filters, digital to analog converters versus analog to digital converters, in TX and RX modes).

Figure 4:
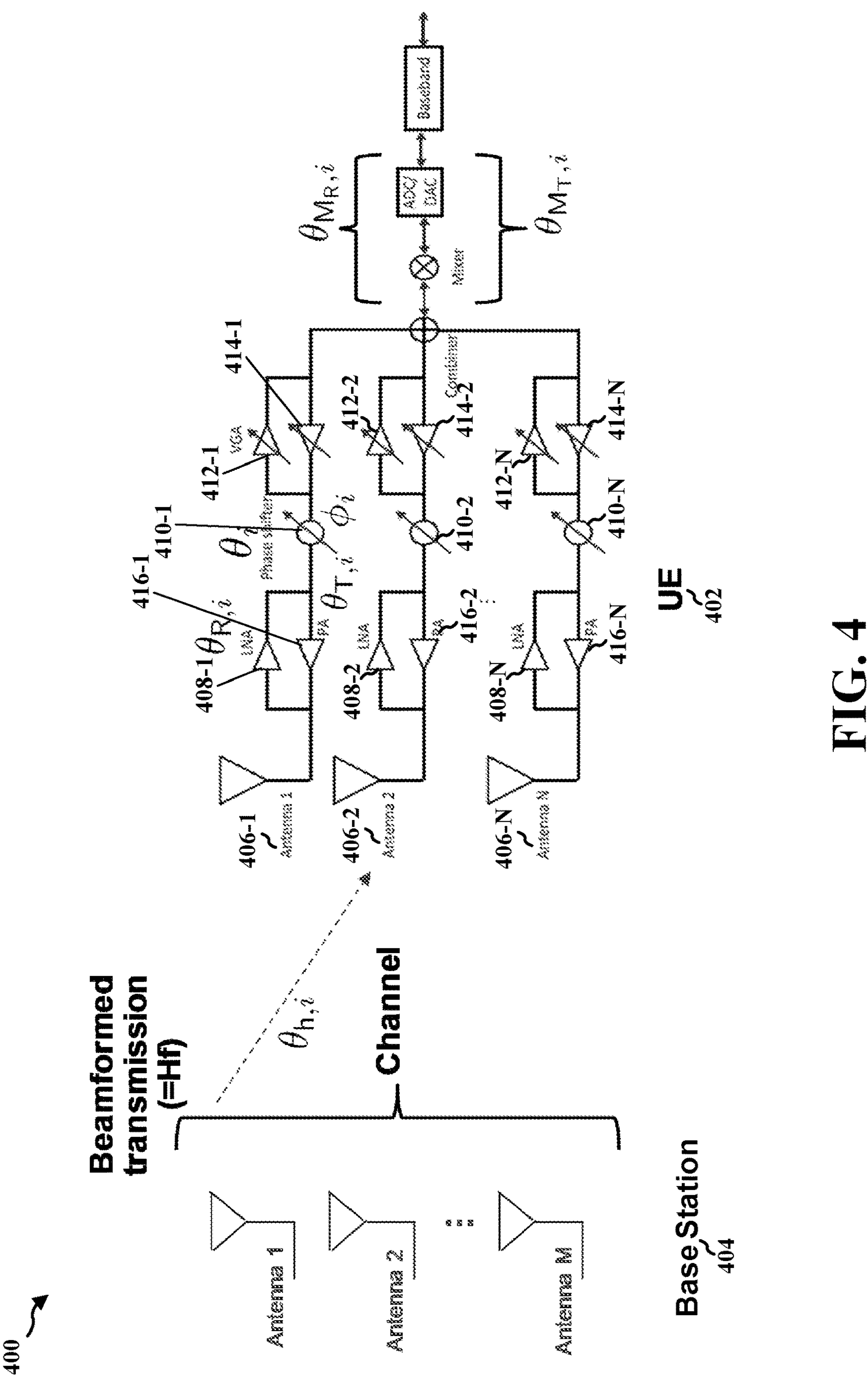
FIG. 4 is a diagram illustrating an example of an offline calibration procedure.

FIG. 4 is a diagram 400 illustrating an example of an offline calibration procedure.

Hybrid beamforming requires a calibrated system between uplink circuitry for uplink communications and downlink circuitry for downlink communications, because different circuitries are used for uplink and downlink communications. With reference to diagram 400 of FIG. 4, the base station 404 may be calibrated while the UE 402 performs an offline calibration procedure. For example, on downlink communications the UE 402 receives the downlink transmission through an antenna (e.g., 406-1, 406-2, 406-N), which then goes through a low noise amplifier (LNA) (e.g., 408-1, 408-2, 408-N), then goes to a phase shifter (e.g., 410-1, 410-2, 410-N), and then through a variable gain amplifier (VGA) (e.g., 412-1, 412-2, 412-N). The downlink signal may then be combined across multiple antennas, via a combiner, and then the downlink signal is converted from RF to an intermediate frequency (IF) signal and from IF to baseband through a set of down converters/mixers and then processed by an analog to digital converter (ADC). For uplink communications, the signal goes in reverse order, but is processed by different hardware elements at the UE. For example, the uplink signal goes from the baseband to a digital to analog converter (DAC), a set of upconverters that converts the signal from baseband to RF. The uplink signal is then split by a splitter and provided to different antenna elements. For example, the signal goes to a VGA (e.g., 414-1, 414-2, 414-N). The signal then goes through the phase shifter (e.g., 410-1, 410-2, 410-N), and then through a power amplifier (PA) (e.g., 416-1, 416-2, 416-N). The signal is then transmitted via the antenna (e.g., 406-1, 406-2, 406-N).

To perform the calibration, the UE takes into account any discrepancies determined between the downlink circuitry and the uplink circuitry. The UE may perform an adjustment based on the discrepancies determined between the downlink circuitry and the uplink circuitry. For example, the UE may receive a downlink transmission and may apply a calibration adjustment to the uplink transmission. The calibration procedure occurs while the UE is offline, before any uplink or downlink communications at the UE.

As frequencies extend through mmW and beyond, the wavelength goes down and the possibility of increasing the number of antenna elements, which in turn may increase the number of calibration adjustment parameters that need to be determined while the UE is offline may increase accordingly. In addition, network entities (e.g., base station, repeaters, or the like) may also have a large number of antenna elements performing an offline calibration procedure within the same amount of time may not occur always.

In some instances, each antenna may be calibrated and each chip for TX and RX mode separately in an offline calibration procedure. However, the calibration of each antenna may result in a high number of test settings which may be unreliable or inconsistent due in part to temperature variations, frequency variations, power levels, or the like. A determination of a calibration adjustment parameter for a sample test equipment may be performed in a chamber for one subset of test settings, such that the determined calibration adjustment parameter is reused across all UEs based on pre-configured adjustment operations. However, such determination of the calibration adjustment parameter occurs as an offline procedure.

Aspects presented herein provide a configuration for determining calibration adjustment parameters in an online calibration procedure. The configuration may utilize a two-way hybrid beamforming operation to perform the online calibration procedure to determine the calibration adjustment parameters. The aspects presented herein may allow a UE to perform an online calibration adjustment operation using a two-way beamforming operation. At least one advantage of the disclosure is that the configuration allows for fast and reliable online operation procedure to determine the calibration adjustment parameters to realize mmW links as band combinations grow. At least another advantage of the disclosure is that the calibration adjustment parameters may be determined based on TX and RX beamforming.

The UE may be configured to initiate the online calibration procedure. For example, the UE may indicate to the base station that channel and/or circuit conditions in the TX/RX circuitry are new or different from what was determined previously in the offline procedure, such that a new calibration needs to be done via an online calibration procedure. The indication may specify the number of antennas (e.g., K antennas) that may be calibrated. In some instances, the K antennas may be less than the available antenna dimensions at the UE. The indication may specify the number of antennas N that may be used in the calibration, where N≤K (e.g., a single antenna or any of the available antennas). The number of antennas N may determine the beamforming gain obtained over the calibration phase or the quality of the signal estimate in the calibration procedure. The indication may be transmitted by the UE to the base station over UCI, RRC signaling, or MAC-CE. However, in some instances, the base station may initiate the online calibration procedure based on information about the link, such as but not limited to prior knowledge on calibration quality at the UE.

In some instances, in response to the UE request to initiate the online calibration procedure, the base station may acknowledge the request and allocate resources to enable the online calibration procedure. The resources may correspond to N uplink symbols, N downlink symbols, and N feedback message configurations for feedback of complex signals from the base station to the UE. The uplink and downlink symbols may be configured in any order. In instances where the base station initiates the online calibration procedure, the base station may allocate the resources accordingly.

The signaling procedure for the online calibration procedure (e.g., training phase) may use beams that are used for data transmissions. In some aspects, the signaling procedure for the online calibration procedure does not use beams that are used for data transmission. The base station may determine coordination between online calibration and data transmissions. In some aspects, online calibration may be independent of data transmissions with independent beams used for each process. In some aspects, the top N beams used for data transmission may be reused for the online calibration procedure, where the top N beams are based on signal quality. The base station may also indicate the number of the top N beams used for data transmission that may be reused for the online calibration procedure, such that not all of the top N beams are used. The base station may indicate the number of the top N beams used for data transmission and reused for the online calibration procedure via SSB transmissions.

To perform the online calibration procedure, multiple antenna measurements may be performed. For example, h=Hf may be the effective channel vector measured at the receiver after beamforming at the base station end, assuming uni-polarized transmissions for simplicity, and a noise-free reception. The base station may beamform along a set of beam weights denoted as f and the UE receives by beamforming. The UE may beamform with N sets of beam weights over N symbols. The UE may make a complex beamformed channel estimate. The beam weights that are used over the N symbols may be denoted as $\{\theta_i^{*,1}\}, \ldots, \{\theta_i^{*,N}\}$ with the received signal on the k-th symbol given as follows:

$$y_R^k = \sum_{i=1}^{N} \alpha_i \cdot e^{j\left(\theta_i^{\star,k} + \theta_{h,i} + \theta_{M_R,i} + \theta_{R,i}\right)}$$

where $\theta_{h,j}$, $\theta_{MR,i}$, and $\theta_{R,i}$ denote the phase response seen with the channel component, the mixer/down converter component and all the other downlink reception components, respectively.

In matrix form, the received signal over the N symbols may be written as follows:

$$\left[y_R^1 \ \ldots \ y_R^N\right] = \left[\alpha_1 \cdot e^{j\left(\theta_{h,1} + \theta_{M_R,1} + \theta_{R,1}\right)} \ \ldots \ \alpha_N \cdot e^{j\left(\theta_{h,N} + \theta_{M_R,N} + \theta_{R,N}\right)}\right] \cdot \begin{bmatrix} e^{j\theta_1^{\star,1}} & \ldots & e^{j\theta_1^{\star,N}} \\ \vdots & \ddots & \vdots \\ e^{j\theta_N^{\star,1}} & \ldots & e^{j\theta_N^{\star,N}} \end{bmatrix}$$

Since $\{y_R^k\}$ and the beam weights used are known, from the above equation, the following may be estimated:

$$\theta_{h,i} + \theta_{M_R,i} + \theta_{R,i}$$

Subsequent to the receptions, the UE may beamform over N symbols by setting $$\{\phi_i^k\} = \{\theta_i^{*,k}\},$$

while the base station receives along f. While the base station beamforms, the base station may obtain the following measurements:

$$\begin{aligned} y_T^k &= \sum_{i=1}^{N} \beta_i \cdot e^{j\left(\theta_i^{\star,k} + \theta_{h,i} + \theta_{M_T,i} + \theta_{T,i}\right)} \\ &= \sum_{i=1}^{N} \beta_i \cdot e^{j\left(\theta_{h,i} + \theta_{M_T,i} + \theta_{T,i}\right)} \cdot e^{j\theta_i^{\star,k}} \end{aligned}$$

where $\theta_{h,i}$, $\theta_{MR,i}$, and $\theta_{R,i}$ denote the phase response seen with the channel component (assumed to be reciprocal for the downlink and uplink paths), the mixer/up converter component at the UE and all the other uplink transmission components, respectively.

In matrix form, we have:

$$\left[y_T^1 \ldots y_T^N\right] = \left[\beta_1 \cdot e^{j\left(\theta_{h,1} + \theta_{M_T,1} + \theta_{T,1}\right)} \ \ldots \ \beta_N \cdot e^{j\left(\theta_{h,N} + \theta_{M_T,N} + \theta_{T,N}\right)}\right] \cdot \begin{bmatrix} e^{j\theta_1^{\star,1}} & \ldots & e^{j\theta_1^{\star,N}} \\ \vdots & \ddots & \vdots \\ e^{j\theta_N^{\star,1}} & \ldots & e^{j\theta_N^{\star,N}} \end{bmatrix}$$

The base station may provide as feedback $\{y_T^k\}$ to the UE, and from the feedback, the UE may estimate $$\theta_{h,i} + \theta_{M_T,i} + \theta_{T,i}$$

The UE may utilize $\{\theta_i^*\}$ for beamforming on RX mode. For beamforming on the TX mode, it sets $\varphi_i$ according to the following formula:

$$\phi_i = \theta_i^* + \Delta\theta M_{RT,i} + \Delta\theta_{RT,i} - \Delta\theta M_{RT,1} - \Delta\theta_{RT,1}$$

$$\Delta\theta M_{RT,i} = \theta_{M_R,i} - \theta_{M_T,i}$$

$$\Delta\theta_{RT,i} = \theta_{R,i} - \theta_{T,i}$$

In some instances, the number of symbols for the online calibration mode is 2N, where N is used for reception, N is used for transmission and associated with a feedback latency of communicating $y_T^k$ to the UE. It is assumed that the channel remains stationary over the 2N measurements. It is assumed that the UE and base station may make complex post-beamformed channel estimate in addition to signal strength or reference signal received power (RSRP) measurements. The base station beam f may be the same over the 2N measurements, and may be done over [2N/K] SSBs, where K measurements may be performed over one SSB corresponding to a speed-up of the measurements process. Speed-up can be implemented with the use of multiple RF chains, self-steering array type circuitry, wake up receiver type circuitry, etc. The choice of $\{\theta_i^{*,k}\}$ may be any choice that makes the matrix unitary. In some aspects, $\{\theta_i^{*,k}\}$ allows UE side beamforming which enables the link budget for the UE side reception and calibration more relaxed, than if only a single antenna is used over every symbol.

FIG. 5 is a diagram 500 illustrating examples of beam weights used for phase measurements. In some aspects, for example where N=4, the diagram 500 provides different possible choices of beam weights (e.g., W1 502, W2 504, W3 506). The example of W3 506 provides an example that reduces to a single antenna measurement case. The example W2 is a size-4 Hadamard matrix. If a Hadamard matrix of size-$2^{k-1}$ is known, and denoted as $H_{2^{k-1}}$, then a Hadamard matrix of size-$2^k$ may be constructed as follows:

$$W = \begin{bmatrix} H_{2^{k-1}} & H_{2^{k-1}} \\ H_{2^{k-1}} & -H_{2^{k-1}} \end{bmatrix}$$

The columns of W may be used as phase measurement beam weights. The Hadamard matrix constructions may be available for all small practical antenna array size dimensions, such that beam weights may be reused for this set. For some antenna dimensions (e.g., N=4), multiple Hadamard matrix constructions may be possible. In some aspects, for general non-power of 2 dimensions, a simple discrete Fourier transform (DFT) beam set may be utilized.

To perform the online calibration procedure, upon initiation by the UE or the base station, the base station may transmit to the UE a first reference signal on a beam f. The UE may beamform and receive the first reference signal. The UE, in response, may transmit to the base station a second reference signal. The second reference signal may use the same beam weight for the transmission of the second reference signal as used to receive the first reference signal. The base station transmits a feedback signal to the UE based on the second reference signal received from the UE. The UE may utilize the feedback signal to compute calibration adjustment factors. The UE may adjust the beamforming weights for transmission based at least on the computed calibration adjustment factors. The UE may communicate with the base station based on the calibration adjustment factors.

The online calibration procedure may take advantage of dead periods where the base station does not transmit anything to the UE, while the UE receives and transmits signals to/from itself. The base station may continue to perform downlink operations (e.g., transmissions to the UE which may be done in SSB periods), and when the UE gets an uplink grant, the UE may transmit to the base station while the base station receives over the same beam. As such, two-way communications may continue to occur as calibration may be performed in an opportunistic manner, when SSBs and/or uplink grants are available. The system parameter changes that require calibration parameter adjustments may be performed online and are not limited to being calibrated in offline procedures.

FIG. 6 is a call flow diagram 600 of signaling between a UE 602 and a network entity (e.g., base station or a component of a base station such as a CU, DU, or RU) 604. The UE 602 may be configured to communicate with the base station 604. For example, in the context of FIG. 1, the base station 604 may correspond to base station 102. Further, a UE 602 may correspond to at least UE 104. In another example, in the context of FIG. 3, the base station 604 may correspond to base station 310 and the UE 602 may correspond to UE 350.

At 606, the UE 602 may transmit an indication comprising a request to initiate an online calibration procedure. The UE 602 may transmit the indication comprising the request to initiate the online calibration procedure to the base station 604. The base station 604 may receive the indication comprising the request to initiate the online calibration procedure from the UE 602. In some aspects, the indication may be transmitted in response to a change in channel conditions or circuit conditions of hardware used at the UE that may lead to a reduced performance of a prior offline calibration procedure initiating an online remediation. In some aspects, the indication may correspond to a number (N) of antenna elements that need online calibration. The number of antenna elements may determine a beamforming gain realized over the online calibration procedure. In some aspects, the indication may be transmitted, to the network entity, via UCI, RRC signaling, or MAC control element (CE) (MAC-CE).

At 608, the base station 604 may transmit an acknowledgement (ACK) message or a non-acknowledgement (NACK) message to the UE 602. The UE 602 may receive the ACK message or the NACK message from the base station 604. The base station may transmit the ACK message or the NACK message in response to receipt of the indication comprising the request to initiate an online calibration procedure from the UE 602. The ACK message may be for an allocation of reference signal resources for the online calibration procedure. The NACK message may decline the allocation of the reference signal resources for the initiation of the online calibration procedure.

At 610, the base station 604 may transmit the allocation of the reference signal resources to enable the online calibration procedure. The base station 604 may transmit the allocation of the reference signal resources to enable the online calibration procedure to the UE 602. The UE 602 may receive the allocation of the reference signal resources to enable the online calibration procedure from the base station 604. In some aspects, the base station may transmit the allocation of the reference signal resources to enable the online calibration procedure upon transmitting the ACK message to the UE 602, in response to receiving the request to initiate the online calibration procedure from the UE 602. In some aspects, the base station 604 may initiate the online calibration procedure with the UE 602, on its own, without receiving a request to initiate the online calibration procedure from the UE 602. For example, the base station 604 may detect a reduced performance of a prior offline calibration procedure, such that the base station initiates the online calibration procedure.

At 612, the base station 604 may transmit a configuration of the online calibration procedure. The base station 604 may transmit the configuration of the online calibration procedure to the UE 602. The UE 602 may receive the configuration of the online calibration procedure from the base station 604. The configuration may coordinate one or more beams used for the online calibration procedure and simultaneous data transmissions. In some aspects, the one or more beams used for the online calibration procedure may be different than the one or more beams used for data transmissions. In some aspects, a subset of the one or more beams used for data transmissions may be used for the online calibration procedure.

At 614, the base station 604 may allocate a set of 2N reference signal resources for an online calibration adjustment. The base station may allocate the set of the 2N reference signal resources for the online calibration adjustment at the UE 602. The N may correspond to a number of antenna elements that may be calibrated at the UE. The online calibration procedure may be associated with reference signal resources. The reference signal resources may comprise a set of 2N reference signal resources.

At 616, the base station 604 may assign N downlink reference signal resources and N uplink reference signal resources. The base station 604 may assign the N downlink reference signal resources and the N uplink reference signal resources over the set of 2N reference signal resources.

At 618, the base station 604 may transmit a first set of reference signal to the UE 602. The UE 602 may receive the first set of reference signals from the base station 604. The base station may transmit the first set of reference signals using a first beam. The UE may receive the first set of reference signals from the base station by beamforming. The UE 602 may receive the first set of reference signals from the base station 604 using N sets of beam weights over N symbols. The UE 602 may receive the first set of reference signals from the base station 604 upon initiation of the calibration procedure.

At 620, the UE 602 may estimate a complex-valued beamformed channel. The UE 602 may estimate the complex-valued beamformed channel based on the first reference signal received from the base station 604.

At 622, the UE 602 may transmit a second set of reference signals to the base station 604. The UE 602 may transmit the second set of reference signals to the base station 604 using the N sets of beam weights. The base station 604 may receive the second set of reference signals from the UE 602.

At 624, the base station 604 may transmit a feedback signal to the UE 602. The feedback signal may comprise measurements of the second set of reference signals, measured by the base station 604, to allow for an online calibration adjustment computation, by the UE 602, based on the feedback signal. In some aspects, the feedback signal may comprise a set of feedback signals. The feedback signal may be transmitted, by the base station 604, in response to receiving the second set of reference signals, from the UE 602.

At 626, the UE 602 may compute a set of calibration adjustment factors. The UE 602 may compute the set of calibration adjustment factors between transmit and receive parts of a set of beam weights. The UE may compute the set of calibration adjustment factors between transmit and receive parts of a set of beam weights based on the feedback signal and the estimated complex-valued beamformed channel.

At 628, the UE 602 may perform a calibration adjustment operation. The UE 602 may perform the calibration adjustment operation based on the computed set of calibrated adjustment factors.

At 630, the UE 602 may communicate with the base station 604 based on the results of the calibration adjustment operation.

Figure 7:
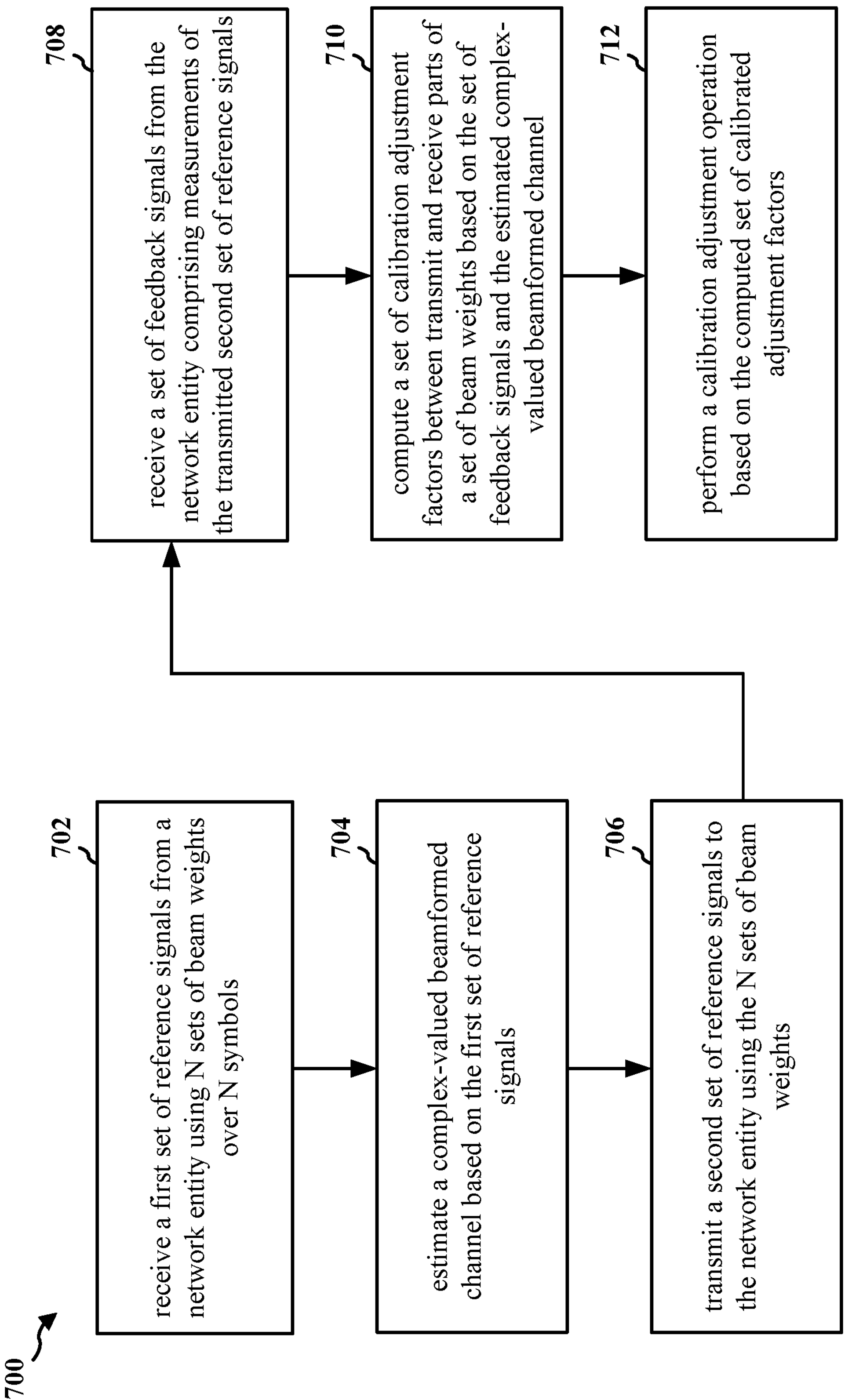
FIG. 7 is a flowchart of a method of wireless communication.

FIG. 7 is a flowchart 700 of a method of wireless communication. The method may be performed by a UE (e.g., the UE 104; the apparatus 904). One or more of the illustrated operations may be omitted, transposed, or contemporaneous. The method may allow a UE to perform an online calibration adjustment operation using a two-way beamforming operation.

At 702, the UE may receive a first set of reference signals from a network entity. For example, 702 may be performed by calibration component 198 of apparatus 904. The UE may receive the first set of reference signals from the network entity using N sets of beam weights over N symbols. The UE may receive the first set of reference signals from the network entity upon initiation of the calibration procedure. In some aspects, the UE may initiate the calibration procedure. In some aspects, the network entity may initiate the calibration procedure.

At 704, the UE may estimate a complex-valued beamformed channel. For example, 704 may be performed by calibration component 198 of apparatus 904. The UE may estimate the complex-valued beamformed channel based on the first set of reference signals received from the network entity.

At 706, the UE may transmit a second set of reference signals to the network entity. For example, 706 may be performed by calibration component 198 of apparatus 904. The UE may transmit the second set of reference signals to the network entity using the N sets of beam weights.

At 708, the UE may receive a set of feedback signals from the network entity. For example, 708 may be performed by calibration component 198 of apparatus 904. The set of feedback signals from the network entity may comprise measurements of the transmitted second set of reference signals.

At 710, the UE may compute a set of calibration adjustment factors. For example, 710 may be performed by calibration component 198 of apparatus 904. The UE may compute the set of calibration adjustment factors between transmit and receive parts of a set of beam weights. The UE may compute the set of calibration adjustment factors between transmit and receive parts of a set of beam weights based on the set of feedback signals and the estimated complex-valued beamformed channel.

At 712, the UE may perform a calibration adjustment operation. For example, 712 may be performed by calibration component 198 of apparatus 904. The UE may perform the calibration adjustment operation based on the computed set of calibrated adjustment factors.

FIG. 8 is a flowchart 800 of a method of wireless communication. The method may be performed by a UE (e.g., the UE 104; the apparatus 904). One or more of the illustrated operations may be omitted, transposed, or contemporaneous. The method may allow a UE to perform a calibration adjustment operation using a two-way beamforming operation.

At 802, the UE may transmit an indication comprising a request to initiate an online calibration procedure. For example, 802 may be performed by calibration component 198 of apparatus 904. The UE may transmit the indication comprising the request to initiate the online calibration procedure to a network entity. In some aspects, the indication may be transmitted in response to a change in channel conditions or circuit conditions of hardware used at the UE that may lead to a reduced performance of a prior offline calibration procedure initiating an online remediation. In some aspects, the indication may correspond to a number (N) of antenna elements that need online calibration. The number of antenna elements may determine a beamforming gain realized over the online calibration procedure. In some aspects, the indication may be transmitted, to the network entity, via UCI, RRC signaling, or MAC-CE.

At 804, the UE may receive an acknowledgement (ACK) message or a non-acknowledgment (NACK) message. For example, 804 may be performed by calibration component 198 of apparatus 904. The UE may receive the ACK message or the NACK message from the network entity. The UE may receive the ACK message or the NACK message in response to the transmission of the indication comprising the request to initiate an online calibration procedure. The ACK message may be for an allocation of reference signal resources for the online calibration procedure. The NACK message may decline the initiation of the online calibration procedure.

At 806, the UE may receive the allocation of reference signal resources to enable the online calibration procedure. For example, 806 may be performed by calibration component 198 of apparatus 904. The UE may receive the allocation of reference signal resources to enable the online calibration procedure from the network entity. The UE may receive the allocation of reference signal resources to enable the online calibration procedure from the network entity upon receipt of the ACK message for the allocation of reference signal resources. In some aspects, the reference signal resources may correspond to N downlink symbols, N uplink symbols, and N feedback message configurations for feedback signaling. The N uplink symbols and the N downlink symbols may be in any permutation or order.

At 808, the UE may receive a configuration of the online calibration procedure. For example, 808 may be performed by calibration component 198 of apparatus 904. The UE may receive the configuration of the online calibration procedure from the network entity. The configuration may coordinate one or more beams used for the online calibration procedure and simultaneous data transmissions. In some aspects, the one or more beams used for the online calibration procedure may be different than the one or more beams used for data transmissions. In some aspects, a subset of the one or more beams used for data transmissions may be used for the online calibration procedure.

At 810, the UE may receive a first set of reference signals from a network entity. For example, 810 may be performed by calibration component 198 of apparatus 904. The UE may receive the first set of reference signals from the network entity using N sets of beam weights over N symbols. The UE may receive the first set of reference signals from the network entity upon initiation of the calibration procedure. In some aspects, the UE may initiate the calibration procedure. In some aspects, the network entity may initiate the calibration procedure.

At 812, the UE may estimate a complex-valued beamformed channel. For example, 812 may be performed by calibration component 198 of apparatus 904. The UE may estimate the complex-valued beamformed channel based on the first set of reference signals received from the network entity.

At 814, the UE may transmit a second set of reference signals to the network entity. For example, 814 may be performed by calibration component 198 of apparatus 904. The UE may transmit the second set of reference signals to the network entity using the N sets of beam weights.

At 816, the UE may receive a set of feedback signals from the network entity. For example, 816 may be performed by calibration component 198 of apparatus 904. The set of feedback signals from the network entity may comprise measurements of the transmitted second set of reference signals.

At 818, the UE may compute a set of calibration adjustment factors. For example, 818 may be performed by calibration component 198 of apparatus 904. The UE may compute the set of calibration adjustment factors between transmit and receive parts of a set of beam weights. The UE may compute the set of calibration adjustment factors between transmit and receive parts of a set of beam weights based on the set of feedback signals and the estimated complex-valued beamformed channel.

At 820, the UE may perform a calibration adjustment operation. For example, 820 may be performed by calibration component 198 of apparatus 904. The UE may perform the calibration adjustment operation based on the computed set of calibrated adjustment factors.

Figure 9:
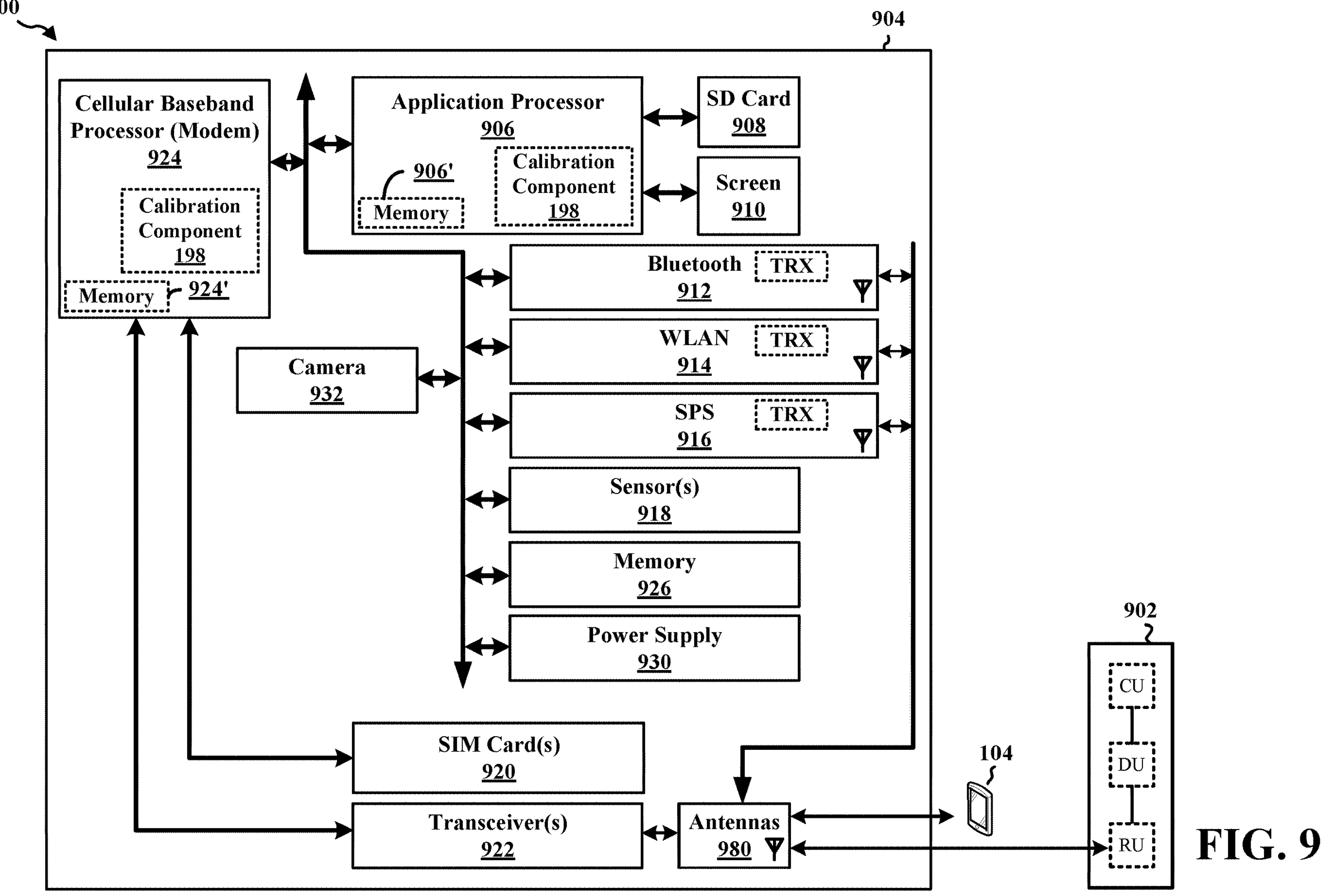
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see 350 of FIG. 3) and include the additional modules of the apparatus 904.

As discussed supra, the component 198 is configured to receive a first set of reference signals from a network entity using N sets of beam weights over N symbols; estimate a complex-valued beamformed channel based on the first set of reference signals; transmit a second set of reference signals to the network entity using the N sets of beam weights; receive a set of feedback signals from the network entity comprising measurements of the transmitted second set of reference signals; compute a set of calibration adjustment factors between transmit and receive parts of a set of beam weights based on the set of feedback signals and the estimated complex-valued beamformed channel; and perform a calibration adjustment operation based on the computed set of calibrated adjustment factors. The component 198 may be within the cellular baseband processor 924, the application processor 906, or both the cellular baseband processor 924 and the application processor 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, includes means for receiving a first set of reference signals from a network entity using N sets of beam weights over N symbols. The apparatus includes means for estimating a complex-valued beamformed channel based on the first set of reference signals. The apparatus includes means for transmitting a second set of reference signals to the network entity using the N sets of beam weights. The apparatus includes means for receiving a set of feedback signals from the network entity comprising measurements of the transmitted second set of reference signals. The apparatus includes means for computing a set of calibration adjustment factors between transmit and receive parts of a set of beam weights based on the set of feedback signals and the estimated complex-valued beamformed channel. The apparatus includes means for performing a calibration adjustment operation based on the computed set of calibrated adjustment factors. The apparatus further includes means for transmitting an indication comprising a request to initiate an online calibration procedure. The apparatus further includes means for receiving an ACK message for an allocation of reference signal resources or a NACK message. The apparatus further includes means for receiving the allocation of reference signal resources to enable the online calibration procedure upon receiving the ACK message. The apparatus further includes means for receiving a configuration of the online calibration procedure. The configuration coordinates one or more beams used for the online calibration procedure and simultaneous data transmissions. The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
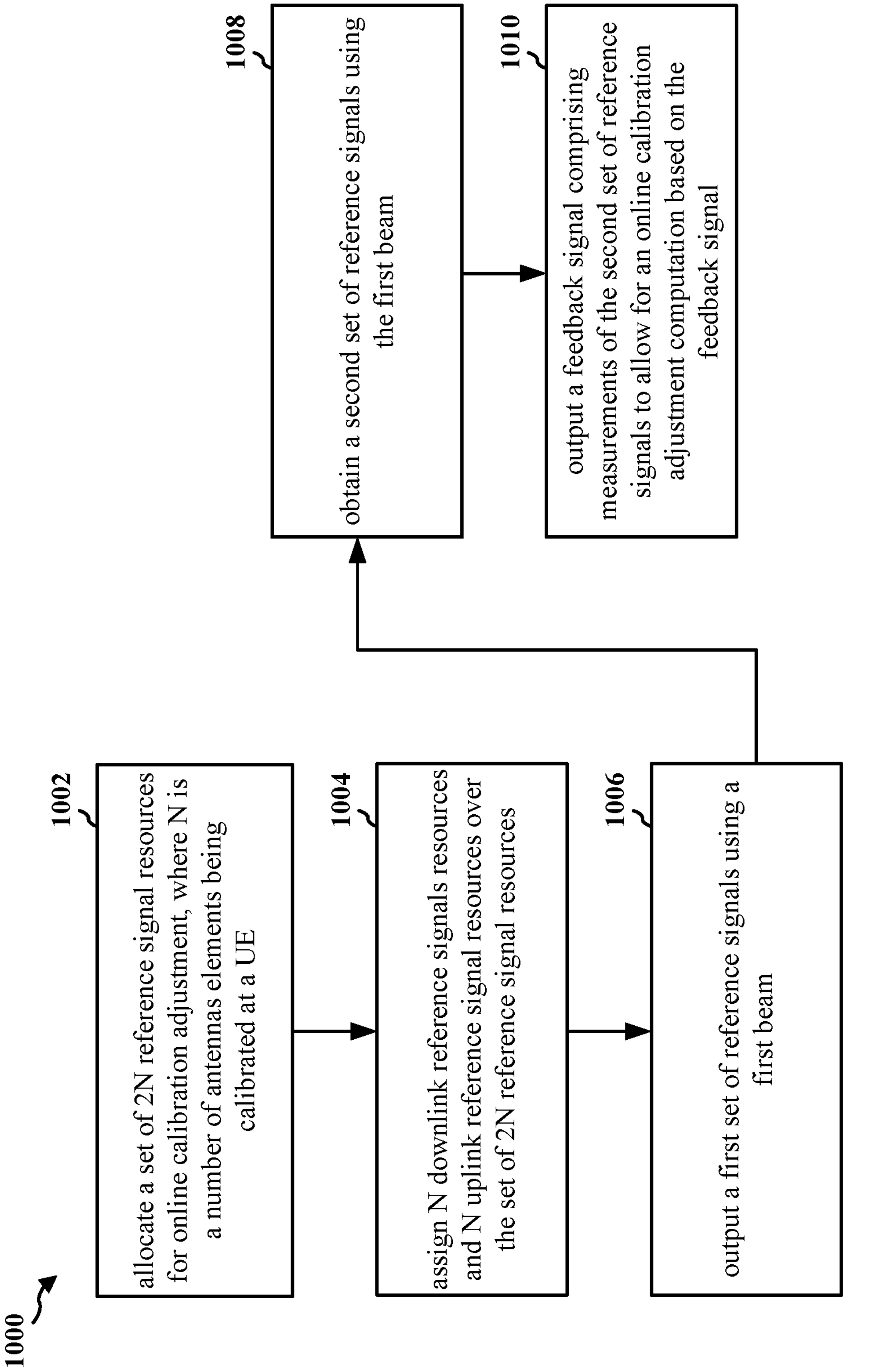
FIG. 10 is a flowchart of a method of wireless communication.

FIG. 10 is a flowchart 1000 of a method of wireless communication. The method may be performed by a base station (e.g., the base station 102; the network entity 1202. One or more of the illustrated operations may be omitted, transposed, or contemporaneous. The method may allow a network entity to configure a UE to perform an online calibration adjustment operation using two-way beamforming operations.

At 1002, the network entity may allocate a set of 2N reference signal resources for an online calibration adjustment. For example, 1002 may be performed by feedback component 199 of the network entity 1202. The base station may allocate the set of the 2N reference signal resources for the online calibration adjustment at a UE. The N may correspond to a number of antenna elements that may be calibrated at the UE.

At 1004, the network entity may assign N downlink reference signal resources and N uplink reference signal resources. For example, 1004 may be performed by feedback component 199 of the network entity 1202. The network entity may assign the N downlink reference signal resources and the N uplink reference signal resources over the set of 2N reference signal resources.

At 1006, the network entity may transmit a first set of reference signals. For example, 1006 may be performed by feedback component 199 of the network entity 1202. The network entity may transmit the first set of reference signals to the UE. The network entity may transmit the first set of reference signals using a first beam.

At 1008, the network entity may receive a second set of reference signals. For example, 1008 may be performed by feedback component 199 of the network entity 1202. The network entity may receive the second set of reference signals from the UE. The network entity may receive the second set of reference signals from the UE using the first beam.

At 1010, the network entity may transmit a feedback signal to the UE. For example, 1010 may be performed by feedback component 199 of the network entity 1202. The feedback signal may comprise measurements of the second set of reference signals to allow for an online calibration adjustment computation based on the feedback signal. In some aspects, the feedback signal may comprise a set of feedback signals.

Figure 11:
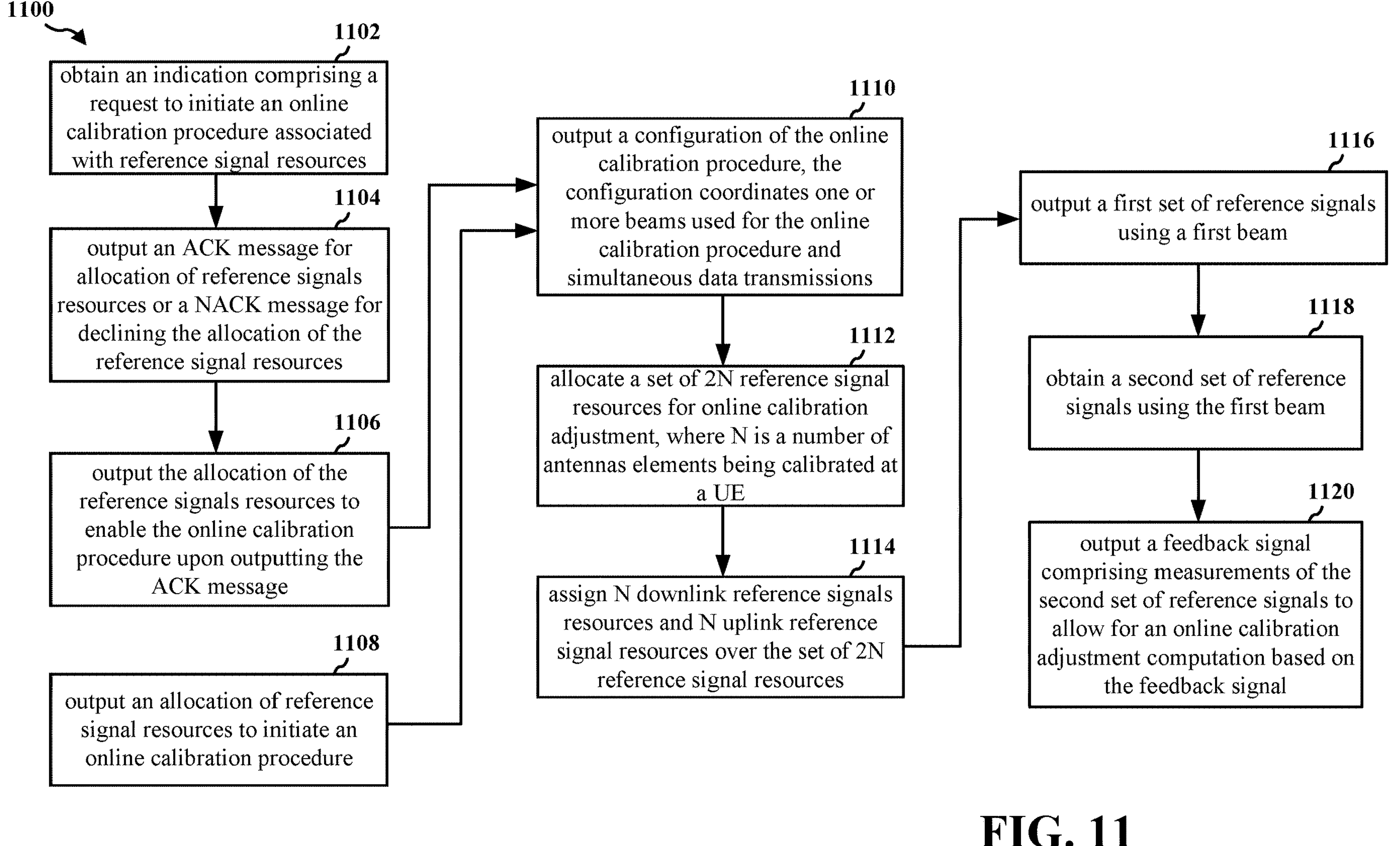
FIG. 11 is a flowchart of a method of wireless communication.

FIG. 11 is a flowchart 1100 of a method of wireless communication. The method may be performed by a base station (e.g., the base station 102; the network entity 1202. One or more of the illustrated operations may be omitted, transposed, or contemporaneous. The method may allow a network entity to configure a UE to perform an online calibration adjustment operation using two-way beamforming operations.

At 1102, the network entity may receive an indication comprising a request to initiate an online calibration procedure. For example, 1102 may be performed by feedback component 199 of the network entity 1202. The network entity may receive the indication comprising the request to initiate the online calibration procedure from the UE. The network entity may receive the indication comprising a request to initiate the online calibration procedure associated with reference signal resources. The reference signal resources may comprise a set of 2N reference signal resources. In some aspects, the indication may be received in response to a change in channel conditions or circuit conditions of hardware used at the UE that may lead to a reduced performance of a prior offline calibration procedure initiating an online remediation. In some aspects, the indication may correspond to a number (N) of antenna elements that need online calibration at the UE. In some aspects, the indication may be received, by the network entity, via UCI, RRC signaling, or MAC-CE. In some aspects, the reference signal resources may include N feedback message configurations for feedback signaling from the UE to the network entity.

At 1104, the network entity may transmit an ACK message or a NACK message. For example, 1104 may be performed by feedback component 199 of the network entity 1202. The network entity may transmit the ACK message or the NACK message to the UE, in response to the received indication. The network entity may transmit the ACK message or the NACK message in response to receipt of the indication comprising the request to initiate an online calibration procedure. The ACK message may be for an allocation of reference signal resources for the online calibration procedure. The NACK message may decline the allocation of the reference signal resources for the initiation of the online calibration procedure.

At 1106, the network entity may transmit the allocation of the reference signal resources to enable the online calibration procedure. For example, 1106 may be performed by feedback component 199 of the network entity 1202. The network entity may transmit the allocation of the reference signal resources to enable the online calibration procedure upon transmitting the ACK message.

At 1108, the network entity may transmit the allocation of reference signal resources to initiate the online calibration procedure. For example, 1108 may be performed by feedback component 199 of the network entity 1202. In some aspects, the network entity may initiate the online calibration procedure with the UE, on its own, without receiving a request from the UE. For example, the network entity may detect a reduced performance of a prior offline calibration procedure, such that the network entity initiates the online calibration procedure.

At 1110, the network entity may transmit a configuration of the online calibration procedure. For example, 1110 may be performed by feedback component 199 of the network entity 1202. The network entity may transmit the configuration of the online calibration procedure to the UE. The configuration may coordinate one or more beams used for the online calibration procedure and simultaneous data transmissions. In some aspects, the one or more beams used for the online calibration procedure may be different than the one or more beams used for data transmissions. In some aspects, a subset of the one or more beams used for data transmissions may be used for the online calibration procedure.

At 1112, the network entity may allocate a set of 2N reference signal resources for an online calibration adjustment. For example, 1112 may be performed by feedback component 199 of the network entity 1202. The base station may allocate the set of the 2N reference signal resources for the online calibration adjustment at a UE. The N may correspond to a number of antenna elements that may be calibrated at the UE.

At 1114, the network entity may assign N downlink reference signal resources and N uplink reference signal resources. For example, 1114 may be performed by feedback component 199 of the network entity 1202. The network entity may assign the N downlink reference signal resources and the N uplink reference signal resources over the set of 2N reference signal resources.

At 1116, the network entity may transmit a first set of reference signals. For example, 1116 may be performed by feedback component 199 of the network entity 1202. The network entity may transmit the first set of reference signals to the UE. The network entity may transmit the first set of reference signals using a first beam.

At 1118, the network entity may receive a second set of reference signals. For example, 1118 may be performed by feedback component 199 of the network entity 1202. The network entity may receive the second set of reference signals from the UE. The network entity may receive the second set of reference signals from the UE using the first beam.

At 1120, the network entity may transmit a feedback signal to the UE. For example, 1120 may be performed by feedback component 199 of the network entity 1202. The feedback signal may comprise measurements of the second set of reference signals to allow for an online calibration adjustment computation based on the feedback signal. In some aspects, the feedback signal may comprise a set of feedback signals.

Figure 12:
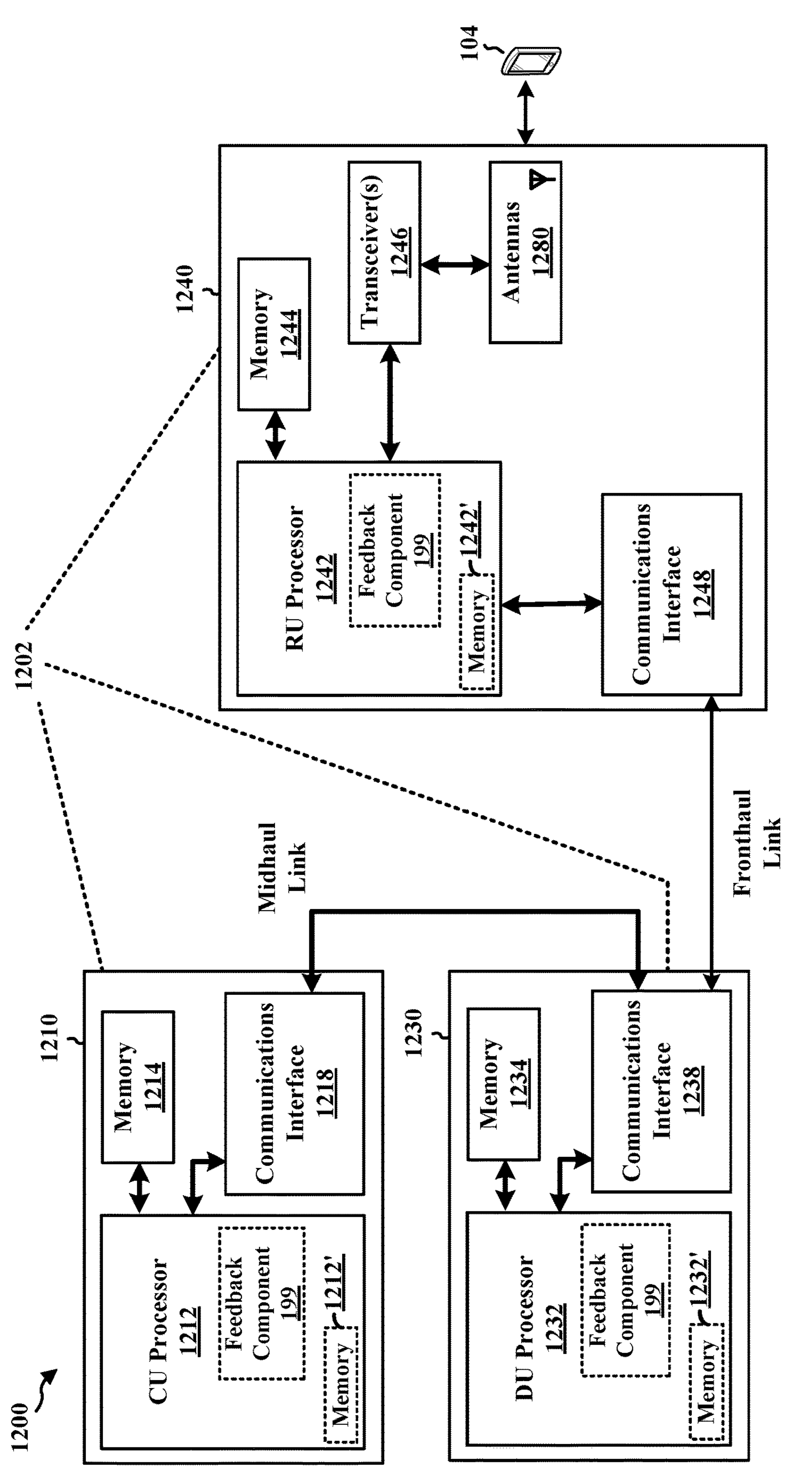
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to allocate a set of 2N reference signal resources for online calibration adjustment, where N is a number of antenna elements being calibrated at a UE; assign N downlink reference signal resources and N uplink reference signal resources over the set of 2N reference signal resources; output a first set of reference signals using a first beam; obtain a second set of reference signals using the first beam; and output a feedback signal comprising measurements of the second set of reference signals to allow for an online calibration adjustment computation based on the feedback signal. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for allocating a set of 2N reference signal resources for online calibration adjustment, where N is a number of antenna elements being calibrated at a UE. The apparatus includes means for assigning N downlink reference signal resources and N uplink reference signal resources over the set of 2N reference signal resources. The apparatus includes means for outputting a first set of reference signals using a first beam. The apparatus includes means for obtaining a second set of reference signals using the first beam. The apparatus includes means for outputting a feedback signal comprising measurements of the second set of reference signals to allow for an online calibration adjustment computation based on the feedback signal. The apparatus further includes means for obtaining an indication comprising a request to initiate an online calibration procedure associated with reference signal resources. The reference signal resources comprising the set of 2N reference signal resources. The apparatus further includes means for outputting, in response to the obtained indication, an ACK message for allocation of reference signal resources or a NACK message for declining the allocation of the reference signal resources. The apparatus further includes means for outputting the allocation of the reference signal resources to enable the online calibration procedure upon outputting the ACK message. The apparatus further includes means for outputting a configuration of the online calibration procedure. The configuration coordinates one or more beams used for the online calibration procedure and simultaneous data transmissions. The apparatus further includes means for outputting an allocation of reference signal resources to initiate an online calibration procedure. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising receiving a first set of reference signals from a network entity using N sets of beam weights over N symbols; estimating a complex-valued beamformed channel based on the first set of reference signals; transmitting a second set of reference signals to the network entity using the N sets of beam weights; receiving a set of feedback signals from the network entity comprising measurements of the transmitted second set of reference signals; computing a set of calibration adjustment factors between transmit and receive parts of a set of beam weights based on the set of feedback signals and the estimated complex-valued beamformed channel; and performing a calibration adjustment operation based on the computed set of calibrated adjustment factors.

Aspect 2 is a method of aspect 1, further including transmitting an indication comprising a request to initiate an online calibration procedure; receiving an acknowledgement (ACK) message for an allocation of reference signal resources or a non-acknowledgement (NACK) message; and receive the allocation of reference signal resources to enable the online calibration procedure upon receiving the ACK message.

Aspect 3 is the method of any of aspects 1 and 2, further includes that the indication is transmitted in response to a change in channel or circuit conditions of hardware used at the UE leading to a reduced performance of a prior offline calibration procedure initiating an online remediation.

Aspect 4 is the method of any of aspects 1-3, further includes that the indication corresponds to N, a number of antenna elements that need online calibration.

Aspect 5 is the method of any of aspects 1-4, further includes that the number of antenna elements determines a beamforming gain realized over the online calibration procedure.

Aspect 6 is the method of any of aspects 1-5, further includes that the indication is transmitted via UCI, RRC signaling, or MAC-CE.

Aspect 7 is the method of any of aspects 1-6, further includes that the reference signal resources correspond to N downlink symbols, N uplink symbols, and N feedback message configurations for feedback signaling.

Aspect 8 is the method of any of aspects 1-7, further includes that the N uplink symbols and the N downlink symbols are in any order.

Aspect 9 is the method of any of aspects 1-8, further including receiving a configuration of the online calibration procedure, wherein the configuration coordinates one or more beams used for the online calibration procedure and simultaneous data transmissions.

Aspect 10 is the method of any of aspects 1-9, further includes that the one or more beams used for the online calibration procedure are different than the one or more beams used for data transmissions.

Aspect 11 is the method of any of aspects 1-10, further includes that a subset of the one or more beams used for data transmissions are used for the online calibration procedure.

Aspect 12 is an apparatus for wireless communication at a UE including at least one processor coupled to a memory and at least one transceiver, the at least one processor configured to implement any of Aspects 1-11.

Aspect 13 is an apparatus for wireless communication at a UE including means for implementing any of Aspects 1-11.

Aspect 14 is a computer-readable medium storing computer executable code, where the code when executed by a processor causes the processor to implement any of Aspects 1-11.

Aspect 15 is a method of wireless communication at a network entity, comprising allocating a set of 2N reference signal resources for online calibration adjustment, where N is a number of antenna elements being calibrated at a UE; assigning N downlink reference signals resources and N uplink reference signal resources over the set of 2N reference signals resources; outputting a first set of reference signals using a first beam; obtaining a second set of reference signals using the first beam; and outputting a feedback signal comprising measurements of the second set of reference signals to allow for an online calibration adjustment computation based on the feedback signal.

Aspect 16 is the method of aspect 15, further including obtaining an indication comprising a request to initiate an online calibration procedure associated with reference signal resources, the reference signal resources comprising the set of 2N reference signal resources; outputting, in response to the obtained indication, an acknowledgement (ACK) message for allocation of reference signal resources or a non-acknowledgement (NACK) message for declining the allocation of the reference signals resources; and outputting the allocation of the reference signals resources to enable the online calibration procedure upon outputting the ACK message.

Aspect 17 is the method of any of aspects 15 and 16, further includes that the indication is obtained in response to a change in channel or circuit conditions of hardware used at the UE leading to a reduced performance of a prior offline calibration procedure initiating an online remediation.

Aspect 18 is the method of any of aspects 15-17, further includes that the indication corresponds to N, a number of antenna elements that need online calibration at the UE.

Aspect 19 is the method of any of aspects 15-18, further includes that the indication is obtained via UCI, RRC signaling, or MAC-CE.

Aspect 20 is the method of any of aspects 15-19, further includes that the reference signal resources include N feedback message configurations for feedback signaling from the UE to the network entity.

Aspect 21 is the method of any of aspects 15-20, further including outputting a configuration of the online calibration procedure, wherein the configuration coordinates one or more beams used for the online calibration procedure and simultaneous data transmissions.

Aspect 22 is the method of any of aspects 15-21, further includes that the one or more beams used for the online calibration procedure are different than the one or more beams used for data transmissions.

Aspect 23 is the method of any of aspects 15-22, further includes that a subset of the one or more beams used for data transmissions are used for the online calibration procedure.

Aspect 24 is the method of any of aspects 15-23, further including outputting an allocation of reference signal resources to initiate an online calibration procedure.

Aspect 25 is an apparatus for wireless communication at a network entity including at least one processor coupled to a memory and at least one transceiver, the at least one processor configured to implement any of Aspects 15-24.

Aspect 26 is an apparatus for wireless communication at a network entity including means for implementing any of Aspects 15-24.

Aspect 27 is a computer-readable medium storing computer executable code, where the code when executed by a processor causes the processor to implement any of Aspects 15-24.

What is claimed is:

1. An apparatus for wireless communication at a user equipment (UE), comprising:

memory; and at least one processor coupled to the memory and, based at least in part on information stored in the memory, the at least one processor is configured to:

receive a first set of reference signals from a network entity using N sets of beam weights over N symbols, wherein N corresponds to a number of antenna elements at the UE that are used for a beamforming calibration;

estimate a complex-valued beamformed channel based on the first set of reference signals;

transmit a second set of reference signals to the network entity using the N sets of beam weights;

receive a set of feedback signals from the network entity comprising measurements of the transmitted second set of reference signals;

compute a set of calibration adjustment factors between transmit and receive parts of a set of beam weights based on the set of feedback signals, the estimated complex-valued beamformed channel, and a discrepancy between a downlink circuitry and an uplink circuitry of the UE; and perform a calibration adjustment operation based on the computed set of calibrated adjustment factors.

2. The apparatus of claim 1, further comprising a transceiver coupled to the at least one processor.

3. The apparatus of claim 1, wherein the at least one processor is further configured to:

transmit an indication comprising a request to initiate an online calibration procedure;

receive an acknowledgement (ACK) message for an allocation of reference signal resources or a non-acknowledgement (NACK) message; and receive the allocation of reference signal resources to enable the online calibration procedure upon receiving the ACK message.

4. The apparatus of claim 3, wherein to transmit the indication, the at least one processor is configured to transmit the indication in response to a change in channel or circuit conditions of hardware used at the UE leading to a reduced performance of a prior offline calibration procedure initiating an online remediation.

5. The apparatus of claim 3, wherein the indication corresponds to N, a number of antenna elements that need online calibration at the UE.

6. The apparatus of claim 5, wherein the number of antenna elements determines a beamforming gain realized over the online calibration procedure.

7. The apparatus of claim 3, wherein to transmit the indication, the at least one processor is configured to transmit the indication via uplink control information (UCI), radio resource control (RRC) signaling, or medium access control (MAC) control element (CE) (MAC-CE).

8. The apparatus of claim 3, wherein the reference signal resources correspond to N downlink symbols, N uplink symbols, and N feedback message configurations for feedback signaling.

9. The apparatus of claim 8, wherein the N uplink symbols and the N downlink symbols are in any order.

10. The apparatus of claim 3, wherein the at least one processor is further configured to:

receive a configuration of the online calibration procedure, wherein the configuration coordinates one or more beams used for the online calibration procedure and simultaneous data transmissions.

11. The apparatus of claim 10, wherein the one or more beams used for the online calibration procedure are different than the one or more beams used for data transmissions.

12. The apparatus of claim 10, wherein a subset of the one or more beams used for data transmissions are used for the online calibration procedure.

13. A method of wireless communications at a user equipment (UE), comprising:

receiving a first set of reference signals from a network entity using N sets of beam weights over N symbols, wherein N corresponds to a number of antenna elements at the UE that are used for a beamforming calibration;

estimating a complex-valued beamformed channel based on the first set of reference signals;

transmitting a second set of reference signals to the network entity using the N sets of beam weights;

receiving a set of feedback signals from the network entity comprising measurements of the transmitted second set of reference signals;

computing a set of calibration adjustment factors between transmit and receive parts of a set of beam weights based on the set of feedback signals, the estimated complex-valued beamformed channel, and a discrepancy between a downlink circuitry and an uplink circuitry of the UE; and performing a calibration adjustment operation based on the computed set of calibrated adjustment factors.

14. The method of claim 13, further comprising:

transmitting an indication comprising a request to initiate an online calibration procedure;

receiving an acknowledgement (ACK) message for an allocation of reference signal resources or a non-acknowledgement (NACK) message; and receiving the allocation of reference signal resources to enable the online calibration procedure upon receiving the ACK message.

15. The method of claim 14, wherein the indication is transmitted in response to a change in channel or circuit conditions of hardware used at the UE leading to a reduced performance of a prior offline calibration procedure initiating an online remediation.

16. The method of claim 14, further comprising:

receiving a configuration of the online calibration procedure, wherein the configuration coordinates one or more beams used for the online calibration procedure and simultaneous data transmissions.

17. An apparatus for wireless communication at a network entity, comprising: memory; and at least one processor coupled to the memory and, based at least in part on information stored in the memory, the at least one processor is configured to: allocate a set of 2N reference signal resources for online calibration adjustment, where N corresponds to a number of antenna elements at a user equipment (UE) that are used for a beamforming calibration; assign N downlink reference signal resources and N uplink reference signal resources over the set of 2N reference signal resources; output a first set of reference signals using a first beam over the N downlink reference signal resources; obtain a second set of reference signals using the first beam; output a feedback signal comprising measurements of the second set of reference signals to allow for a calibration adjustment computation based on the feedback signal and a discrepancy between a downlink circuitry and an uplink circuitry of the UE; and communicate with a user equipment (UE) using a computed set of calibration adjustment factors between transmit and receive parts of a set of beam weights based on the set of feedback signals, an estimated complex-valued beamformed channel based on the first set of reference signals, and the discrepancy between the downlink circuitry and the uplink circuitry of the UE.

18. The apparatus of claim 17, further comprising a transceiver coupled to the at least one processor.

19. The apparatus of claim 17, wherein the at least one processor is further configured to:

obtain an indication comprising a request to initiate an online calibration procedure associated with reference signal resources, the reference signal resources comprising the set of 2N reference signal resources;

output, in response to the obtained indication, an acknowledgement (ACK) message for allocation of reference signal resources or a non-acknowledgement (NACK) message for declining the allocation of the reference signals resources; and output the allocation of the reference signals resources to enable the online calibration procedure upon outputting the ACK message.

20. The apparatus of claim 19, wherein to obtain the indication, the at least one processor is configured to obtain the indication in response to a change in channel or circuit conditions of hardware used at the UE leading to a reduced performance of a prior offline calibration procedure initiating an online remediation.

21. The apparatus of claim 19, wherein the indication corresponds to N, a number of antenna elements that need online calibration at the UE.

22. The apparatus of claim 19, wherein to obtain the indication, the at least one processor is configured to obtain the indication via uplink control information (UCI), radio resource control (RRC) signaling, or medium access control (MAC) control element (CE) (MAC-CE).

23. The apparatus of claim 19, wherein the reference signal resources include N feedback message configurations for feedback signaling from the UE to the network entity.

24. The apparatus of claim 19, wherein the at least one processor is further configured to:

output a configuration of the online calibration procedure, wherein the configuration coordinates one or more beams used for the online calibration procedure and simultaneous data transmissions.

25. The apparatus of claim 24, wherein the one or more beams used for the online calibration procedure are different than the one or more beams used for data transmissions.

26. The apparatus of claim 24, wherein a subset of the one or more beams used for data transmissions are used for the online calibration procedure.

27. The apparatus of claim 17, wherein the at least one processor is further configured to:

output an allocation of reference signal resources to initiate an online calibration procedure.

28. A method of wireless communication at a network entity, comprising: allocating a set of 2N reference signal resources for online calibration adjustment, where N corresponds to a number of antenna elements at a user equipment (UE) that are used for a beamforming calibration; assigning N downlink reference signal resources and N uplink reference signal resources over the set of 2N reference signal resources; outputting a first set of reference signals using a first beam over the N downlink reference signal resources; obtaining a second set of reference signals using the first beam; outputting a feedback signal comprising measurements of the second set of reference signals to allow for a calibration adjustment computation based on the feedback signal and a discrepancy between a downlink circuitry and an uplink circuitry of the UE; and communicate with a user equipment (UE) using a computed set of calibration adjustment factors between transmit and receive parts of a set of beam weights based on the set of feedback signals, an estimated complex-valued beamformed channel based on the first set of reference signals, and the discrepancy between the downlink circuitry and the uplink circuitry of the UE.

29. The method of claim 28, further comprising:

obtaining an indication comprising a request to initiate an online calibration procedure associated with reference signal resources, the reference signal resources comprising the set of 2N reference signal resources;

outputting, in response to the obtained indication, an acknowledgement (ACK) message for allocation of reference signals resources or a non-acknowledgement (NACK) message for declining the allocation of the reference signal resources; and outputting the allocation of the reference signal resources to enable the online calibration procedure upon outputting the ACK message.

30. The method of claim 29, further comprising:

outputting a configuration of the online calibration procedure, wherein the configuration coordinates one or more beams used for the online calibration procedure and simultaneous data transmissions.

* * * * *